United States Patent [19]
Murphy

[11] Patent Number: 5,374,353
[45] Date of Patent: Dec. 20, 1994

[54] AERATION TRAIN AND AERATION APPARATUS FOR BIOLOGICAL PURIFICATION OF WASTEWATER

[76] Inventor: D. Thomas Murphy, 584 Mililani Dr., Kihei, Hi. 96753

[21] Appl. No.: 48,303

[22] Filed: Apr. 19, 1993

Related U.S. Application Data

[63] Continuation-in-part of Ser. No. 6,967, Jan. 21, 1993, Pat. No. 5,136,671.

[51] Int. Cl.[5] .................................. B01D 21/30
[52] U.S. Cl. ................................... 210/121; 210/220; 210/242.2; 210/519; 210/620
[58] Field of Search ............ 210/121, 141, 220, 221, 210/221.2, 242.2, 519, 521, 614, 620, 629

[56] References Cited

U.S. PATENT DOCUMENTS

| | | | |
|---|---|---|---|
| 2,140,059 | 12/1938 | Simonsen | 210/519 |
| 2,415,048 | 1/1947 | Sharp | 210/220 |
| 3,033,372 | 5/1962 | Riddick | 210/220 |
| 3,907,672 | 9/1975 | Milne | 210/220 |
| 4,278,541 | 7/1981 | Eis et al. | 210/519 |
| 4,287,062 | 9/1981 | Von Nordenskjold | 210/220 |
| 4,439,323 | 3/1984 | Ball | 210/608 |
| 4,468,327 | 8/1984 | Brown | 210/626 |
| 4,563,277 | 1/1986 | Tharp | 210/220 |
| 4,596,658 | 6/1986 | Mandt | 210/626 |
| 4,711,716 | 12/1987 | Calltharp | 210/136 |
| 4,797,212 | 1/1989 | Von Nordenskjold | 210/614 |
| 4,883,602 | 9/1989 | Anderson | 210/776 |
| 4,891,128 | 1/1990 | Goronszy | 210/121 |
| 4,966,705 | 10/1990 | Jamieson | 210/605 |
| 5,089,179 | 2/1992 | Von Nordenskjold | 210/242.2 |
| 5,186,821 | 2/1993 | Murphy | 210/519 |
| 5,316,671 | 5/1994 | Murphy | 210/220 |

*Primary Examiner*—Joseph W. Drodge

[57] ABSTRACT

System for the biological purification of wastewater influent to facilitate the aerobic, anoxic, anaerobic treatment phases of the activated sludge extended aeration technology having an inlet to continuously accommodate influent flows and requiring no outlet and accomplishing all of the functions of flow equalization, high efficiency mixing, biological oxidation, nitrification, denitrification, clarification (secondary sedimentation) and aerobic sludge digestion in a single basin without a quiet or calmed zone adjacent the outlet created by a floating partition, sludge collection trough, sludge recirculation duct, or sweeping devices. The system incorporates an omni-directional partition assembly adjacent the inlet and an aerator assembly having flexible conduit air supplies attached to bottom aerators.

7 Claims, 5 Drawing Sheets

FIG. 1

AERATION TRAIN AND AERATION APPARATUS FOR BIOLOGICAL PURIFICATION OF WASTEWATER

The present invention is a continuation-in-part application of Ser. No. 08/006,967, filed Jan. 21, 1993 now U.S. Pat. No. 5,316,671 filed by the same inventor.

FIELD OF THE INVENTION

This invention relates to wastewater treatment and more particularly to a system involving a single open basin or tank that accommodates influent flows continuously having a cyclic operation which includes air diffusion, liquid/solids separation and then decanting.

BACKGROUND OF THE INVENTION

U.S. patent applications 08/006967 and 08/032,112, disclose and claim an improved wastewater treatment process referred to as I.D.E.A. "C.F.C.R." which is an acronym for "Intermittent Decant Extended Aeration Continuous Feed Cyclic Reactor" and incorporates CONTINUOUS FEED activated sludge technology with intermittent CYCLIC system operation requiring only a SINGLE BASIN. The system uses a single tank (reactor basin), preferably made of fiberglass in which the activated sludge is aerated over a number of predetermined cycles. Solid/liquid separation occurs during the air-off cycle. Treated effluent is decanted or withdrawn from directly below the liquid surface. Influent inflow is continuously accommodated at all times. In this way the function of flow equalization, biological oxidation, nitrification, denitrification, secondary sedimentation and aerobic sludge digestion are all carried out in a single vessel. The duration of a cycle is specific to each design application and variable in the field as required.

The Continuous Feed Cyclic Reactor (C.F.C.R.) Process of the I.D.E.A. System combines SBR, ICEAS, and Continuous Flow Activated Sludge and Extended Aeration Principles. It is a fill and draw system which accommodates continuous feed (influent) to the tank (reactor basin). The heart of the process lies in the activated sludge blanket which reduces the BOD5 (biological oxygen demand) and TSS (total suspended solids) and removes nitrogen and phosphorous in the absence of polymers or filters. Food to microorganism ratios (F:M) may vary from 0.03 to 0.3 lb. of BOD5/lb of MLSS/DAY and mixed liquor suspended solids (MLSS) design concentrations range from 1,000 to 15,000 mg/l. Actual practice has shown MLSS concentration in the 2,000 to 8,000 mg/l range to be most effective. With a hydraulic retention time (HRT) targeted for 18-36 hours and a sludge age (SRT) of at least 20 days. The Intermittent Decant Extended Aeration (I.D.E.A.) system is sized according to extended aeration standards. With such design parameters, typical excess solids (waste sludge) production ranges from 0.5 to 1.0 LB/LB of BOD5 removed. The sludge produced is quite stable with an insignificant (O2) uptake rate and may be stored in a gravity sludge thickener without aeration or odors.

One of the major process advantages of the Intermittent or Cycled Extended Aeration Process (EPA Design manual "On Site Waste-Water Treatment and Disposal Systems", October 1980.) used in the I.D.E.A. System is that it provides nitrification/denitrification in addition to carbonaceous BOD5 reduction and solids removal without the addition of methanol as an organic carbon source. In addition, denitrification enhances alkalinity recovery. This prevents a PH drop which could contribute to filamentous growth and bulked sludge. Alkalinity recovery is particularly advantageous in regions of low natural alklinity.

It is this unique cyclic process which allows the I.D.E.A System to accomplish nitrification and denitrification. During aeration, biological oxidation and mixing occur. Blower sizing typically provides for 1.4 to 1.6 LBS. of (O2)/LB of BOD applied/day. For very low strength waste, 20 SCFM/1000 cubic feet reactor volume is provided for mixing. During aeration, excess oxygen is present, and Nitrosomonas sp. oxidize the Ammonia Nitrogen (N/NH3) to Nitrite Nitrogen (N/NO2). Nitrobacter sp. further oxidize the Nitrite Nitrogen (N/NO2) to Nitrate Nitrogen (N/NO3). Both of these are naturally occurring bacteria as a result of this Intermittent or Cycled Extended Aeration "CFCR" Process.

Nitrate, Nitrite, Ammonia and Organic Nitrogen are all inter-related in wastewater. All of these forms of Nitrogen, as well as Nitrogen Gas are biochemically interconvertible. Ammonia is generally found in large quantities in fresh domestic wastewater, however Nitrate is found only in small amounts. But in the effluent of conventional Nitrifying biological treatment plants, Nitrate is found in concentrations of up to 50 mg/L Nitrate Nitrogen. Nitrite is an intermediate state of Nitrogen, both in the oxidation of Ammonia to Nitrate and in the reduction of Nitrate to Nitrogen Gas. Such oxidation occurs in the I.D.E.A System.

During non-aerated periods (sedimentation and decantation), the Dissolved Oxygen (DO) level in the sludge blanket (MLSS) approaches zero. The lack of molecular oxygen (O2) encourages Pseudomonas sp. and other denitrifying bacteria to attack the oxygen bound up in the Nitrate (NO3) molecules. The bacteria then reduce the Nitrate (NO3) molecules to nitrogen (N2) and oxygen (O2). The molecular Nitrogen (N2), a gas, is released to the atmosphere, while the bacteria utilize the liberated Oxygen (O2). Thus, alternation of oxic and anoxic periods in the I.D.E.A. basin promotes Ammonia Nitrogen (N/NH3) removal from the waste stream of 95% or better.

Additional Nitrogen removal is accomplished through assimilation (absorption and incorporation) of Nitrogen into bacterial cell mass in satisfaction of metabolic needs. This Nitrogen is removed from the system when excess sludge is wasted from the I.D.E.A. basin. Actual operating data have shown the concentration of nitrogen in the sludge mass to be between 5% and 8% by weight of the dry solids. As can be seen, the nutrient removals and high degree of treatment characteristic of tertiary treatment systems can be had at the cost of an I.D.E.A. "CFCR" secondary treatment system.

In a draw and fill cyclic aeration system such as disclosed in the above references it becomes necessary to stir up the sludge blanket after the settle phase and this is done in several ways in the prior art.

One method is exemplified by U.S. Pat. No. 3,907,672 which uses an air diffuser line which is positioned along one side of the central chamber near the bottom of the tank to diffuse air into the chamber and to promote circulation. This system of diffusing air from a permanent manifold located near or on the bottom of a chamber to be aerated is standard and well known in the industry of wastewater treatment and has been used as a system of engineering choice in many facilities.

A second method of stirring up the sludge blanket is exemplified by U.S. Pat. No. 4,818,392 which uses a motorized fan to stir up the effluent by drawing the effluent upward creating currents to lift the sludge blanket.

A third alternative is taught by common usage prior art in which grid-shaped bottom aerators are suspended from a bridge structure extending transversely of a channel-type basin. In order to ensure adequate aeration of the active sludge over the full length of the basin, the bridge structure is mounted for reciprocating movement in the longitudinal direction of the channel. It is also suggested to attach the bottom aerators to a float which may be dragged through the basin without being supported by the bridge structure carried by the basin walls.

Basins of this type are constructed as so-called compact installations, but sometimes also as large scale installations. It has become evident, however, that a sufficiently safe control of the active sludge required for the wastewater purification can be achieved in an economical manner only, if at all, in the case of the smaller compact installations. In the case of larger installations there is always the danger that the active sludge in certain areas dies off in an uncontrolled manner, leading to unstable conditions in the basin during the purification of wastewater.

The smaller installations as well as the larger installations suffer from the disadvantage that their construction and operation are rather expensive. The treatment basins, which in most cases are concrete structures are expensive to build, and the mechanical installations for moving the bottom aerators and controlling the aeration process are complicated and subject to failure. In addition to high capital investment this results in high operating costs mainly due to high manpower costs.

The high investment and operating costs of an installation of this type frequently leads to several communities forming a joint venture, however, this necessitates the construction of sewers from the participating communities to the common wastewater treatment plant. The costs of such sewers often exceed those of the treatment plant itself.

In view of these disadvantages, large-scale earthen basin installations with and without artificial aeration have been developed for plants serving up to about 100.000 PUV (population unit value). Pure earthen basins without artificial aeration have conventionally been built only for a few hundred PUV. In these basins there prevail undefined decomposition conditions between aerobic and anaerobic areas, so that an active sludge in the usual sense cannot develop. Since the absorption of oxygen takes place only at the surface, installations of this type have to have a very large surface area, and their operation in winter is unsatisfactory. The dwelling time of the wastewater in these installations is usually 30 days and above.

The installations developed from such earthen basin installations and provided with line aerators or other devices, such as spot aerators are permitted to reduce the surface area requirements, however, they are still suffering from ill defined conditions as concerns their operation, resulting in dwelling times of domestic wastewater of 10 to 20 days in the aerated sector, and of up to 30 days in the installation as a whole. In installations operating under higher load one has to accept extremely long dwelling times again requiring excessively large installations. While aerobic conditions prevail in certain areas of these installations, they are not controllable, and area with anaerobic conditions cannot be avoided.

Still another alternative is exemplified by U.S. Pat. 4,287,062 which teaches multiple bottom aerators which are connected to a flexible cable extending over the basin in such a manner that the aerators together with the carrier are periodically driven back and forth traversely of the longitudinal extent of the carrier by, it is claimed, the air exiting from the aerators. As stated in the '062 reference, Col. 10, line 52, "due to the basic drift from the inlet to the outlet, the wastewater moves slowly in the direction towards the outlet together with the active sludge suspended therein by the continuous action of introduced air".

Reference '062 being a continuous aeration system does not use cyclic periods of air-off, settle and decant as does the present invention but continuously disturbs the biomass contributing to a weak strain of microorganisms and requires an outlet as the system is a flow-thru system, i.e., a gallon in, a gallon out. Also, the '062 reference requires many additional components such as a sludge re-circulation duct extending from a so-called calm zone to a position adjacent the inlet, a floating overflow with controllable flow-thru, a sludge collecting trough in the form of a V, a floating partition wall located laterally of said overflow towards the center of the basin, a sweeper device above the sludge collecting trough, sludge pumps and other complicated requirements too numerous to mention.

The present invention addresses these and other problems inherent in the above systems and while the above systems are somewhat successful for their own purpose, they are not fully satisfactory systems.

SUMMARY

It is therefore, a primary object to provide an aeration system which cooperates with and augments the principals taught in the 08/006,907 and 08/032,112, which are incorporated herein by reference.

It is another object to provide an aeration system which cooperates with a draw and fill wastewater treatment system.

Still another object is to provide an aerator system which is a function of a cyclic wastewater treatment system.

Still another important object is to provide an aeration system with a first and second position during the air/off, air/on cycle, namely, a first position being an air-on position, for providing aeration to at least one bottom aerator being suspended from an air supply flexible conduit aeration source, with the suspended aerator intermittently discharging aerobic treatment air adjacent to the bottom of the basin, which, when rising to the liquid surface, causes upward currents resulting in a swell beneath the home position of the aerator carrier thus perpetually sweeping the aerator carrier away from its home position in a random direction while the connected aerator trails at a relative distance moving the aerator omni-directionally over the basin floor covering an amoebic shaped area. A second position being an air-off position in which said aeration apparatus lies at rest during the settling and decanting cycles.

Another object is to provide two tubular supports made of a flexible material which will provide a more dependable air and aeration supply and also allow a whip action at the travel limit to change the direction of travel of the respective train.

Still another object is to provide a wastewater treatment system that improves solids settleability throughout the entire basin with the entire basin becoming a clarifier during the air/off phase of its cycle.

Yet another important object is to only require the aeration equipment to operate intermittently such as every other two hour period instead of 24 hours a day.

Yet another object is to provide enough slack in the air supply cable to allow the apparatus to assume its first or second position.

Still another object is to provide the float means in a form independent of each other but attached together by a common air supply carrier to form a "train" thus allowing each float means to assume a random position other than a straight line position with each other.

Still another object is to facilitate the entire extended aeration process in a single basin without the need for an intregal or external clarifier and associated sludge pumping equipment, wiers, skimmers, sludge return yard piping and tankage or calm zone.

Yet another object is to effectively mix one million gallons of mixed liquor in an aeration basin using only 10-20% of the horsepower requirement that currently is the industry standard of 100 horsepower per 1 million gallons of aeration basin for low strength single basin waste treatment systems.

Another object is to provide an aeration system that will enable a fill and draw type of the extended aeration process to operate in a basin designed to provide a sludge age or sludge retention time (SRT) of at least 70 days with the same or less energy requirements than the prior art has in a system that offers a sludge age of only 20 days.

Still another object is to provide an aeration system that decreases the sludge production of such systems by as much as 70%, thereby substantially decreasing the handling costs of excess solids removal and disposal.

It is another important object to provide, at least at one end of each aeration train, means to control on demand an air-input and air-shut off control system such as solenoid controlled air valves which may be activated and controlled by the cyclic timer of the wastewater treatment system so as to further reduce the power requirements of this system during low use periods such as between 10:00 PM and 6:00 AM.

Another object is to provide the aerators in a configuration to prevent entanglement when two or more of the aerators approach each other.

Yet another object is to take advantage of the natural whirlpools, current and eddy's which are created by the introduction of air into the lower regions of the basin by the aerators in the form of minute, fine bubbles, which when rising create a natural swirling motion of the liquid and as they reach the surface, cause the surface to "boil". It is this natural occurrence that further causes the aeration and float trains to wander in an un-determined manner and they are not solely dependent on "push" from the air escaping out of the aerators or currents created in prior art basin design which require an inlet and an outlet.

Another object is to provide fine bubble diffusers attached to floats in a "train" which are allowed to move in the basin by natural occurring turbulence during aeration.

Still another object is to provide efficient mixing of the basin contents, as well as high oxygen transfer, at low energy usage.

Another important object is to eliminate expensive aeration piping which the present prior art systems require to be installed and which must be leveled and/or secured.

Another object is to provide the aeration trains with self-leveling diffusers which, by their design, do not harm a basin liner or erode an unlined basin bottom such as an earthen basin.

Still another important object is to provide by means of the trains of diffusers, additional mixing capabilities other than aeration which will result in reduced horsepower requirements as high as 85% in low organic loading municipal systems.

Yet another object is to make inspection and maintenance cost-effective by eliminating the need for dewatering the basin.

Also, another important object is to provide air pressure regulators in the separate carrier train air supplies to allow for different control settings for fine tuning the system as the job site requires.

Another important object is to provide an aeration apparatus which may be used in any open basin such as an earthen or concrete basin and is not limited in size or length to any one basin size, making this design the lowest cost alternative available.

When the above objects are achieved and implemented by the design perameters of the present invention, a supernatant is produced with a drastic reduction of horsepower requirement and excess solids (waste sludge) production ranging from 0.2 to 0.5 are common with a hydraulic retention time (HRT) ranging from 16-72 hours and a sludge age (SRT) from 20-85 days.

In order to attain these objects, the invention provides that the bottom aerators are connected to at least one flexible carrier extending over the basin in such a manner that the bottom aerators together with the carrier are perpetually swept away from its home position by surface boils or swells in a random direction while the connected aerator trails at a relative distance moving the aerator omni-directionally over the basin floor covering an amoebic shaped area. The surface boils are created by the air exiting from the aerators adjacent the bottom and by the whirlpools, currents and eddy's created by the air.

The apparatus according to the invention is of simple construction and provides the possibility of inexpensive fully biological wastewater purification. The apparatus is not restricted to basins of predetermined size and/or shape. The advantages of the invention are more effectively exploited, however, in large basins, since on the one hand a greater container and therefore buffer volume is available and on the other hand, the fully biological purification can be safely and easily controlled with the apparatus acccording to the invention. Independent of their size and shape, the basins can be constructed as simple earth basins with a greater or lesser degree of strengthening. This results in considerable savings by comparison to the conventional expensive constructions. In addition, the apparatus according to the invention may be enlarged without major difficulties, as long as there is space available, either by enlarging the existing earth basins in a very short time, or by adding further earth basins to the installation. Large basins also offer the advantage that even strong fluctuations of the wastewater amount, contaminant loading, content of sediment substances and PH vague can be evened out.

The apparatus according to the invention requires only a very small energy input for the basin aeration. The bottom aerators are series-connected in the manner of a train and are constantly driven over a certain operating range by falling off the air boils created on the surface by air exiting therefrom adjacent the bottom and by the whirlpools, currents and eddy's. The range of operation depends on the length and construction of the aerator train. If the train is kept under some tension, its range will be smaller than in the case of some slack in the train. The bottom omni-directional sweeping movement of the aerator results in a strong agitation of the wastewater and the active sludge contained therein over large areas. By the introduction of the air in the form of small bubbles the sludge is on the one hand nourished and thus kept alive with a minimum amount of aeration required. Depending on the arrangement and construction of the aerator trains the sludge may well rest on the basin's bottom for short periods. The omni-directional sweeping movement of the aerator trains assuredly prevents the sludge from resting on the bottom for excessively long periods that can cause the microorganisms to die off.

The introduction of the air in the form of small bubbles results in a great volume of the wastewater being aerated, which has a favorable effect on the maintenance of the active sludge. In addition, the small bubbles rise very slowly, so that their dwelling time in the wastewater to be purified is extended.

The periodical movements of the aerator trains results in a uniform treatment and mixing over the entire basin area. Between the stationary points at which the carriers are anchored the trains may assume any shape, e.g. an arcuate or serpentine configuration. It has been found that adjacent aerator trains will, after some time, harmonize their movements so as to move back and forth more or less in unison.

The periodical omni-directional sweeping movement of the aerator trains offers the advantage that after each reversal of their movement the trains will move through basin area in which the active sludge has already absorbed the previously introduced oxygen, so that there exists a certain oxygen deficiency in the respective zones, enabling the newly introduced oxygen to be readily absorbed. With respect to the oxygen absorption it is also advantageous to employ a large basin in connection with the apparatus according to the invention, since a large surface area of the wastewater permits the direct absorption of considerable amounts of oxygen, thereby reducing the oxygen requirements of the system resulting in further reductions in operating costs.

As mentioned above, the basins may be constructed as simple earth basins, which in combination with the aeration method according to the invention, results in low investment and maintenance costs. There is also the possibility of increasing the capacity of an existing installation without enlarging the basin or basins by providing the aerator trains with additional bottom aerators.

Depending on the configuration of the basin and the range of operation of each aerator train, the ends of the trains may be anchored at fixed points within the basin or outside thereof. For providing the aerator trains with a larger range of operation, their ends may not be anchored at a fixed point, but may instead be movably attached to guide means preferably extending transversely of the longitudinal direction of the carrier so as to enlarge the lateral movement range of the aerator trains. The guide means may for instance comprise wire ropes extending transversely of the longitudinal direction of the carrier, the carrier being slidably and eventually releasably connected thereto by means of hooks, eyelets or the like. The anchoring points of the carrier may also be located on carriages adapted for movement transversely of the longitudinal direction of the carrier and possibly guided on rails. Since the aerator trains are not only free to move laterally, i.e. in the direction of the water level, but may also be supported between their anchoring points so as to be variable in the vertical direction, the apparatus according to the invention offers the possibility to vary the water level within the basin without the necessity of adjusting the aerator trains to different water levels. This adjustment occurs automatically, since the floating aerator trains will always adapt their height to the water level.

In order to be able to vary the range of operation of the aerator trains, at least one end of the respective carriers may be provided with a length of link chain the links of which may be selectively connected to the respective anchoring point so as to vary the free length of the aerator train and thus its range of operation.

The air Introduced by means of the aerator trains is also effective to set up extensive circulations in the surrounding water volume. The air exiting from each bottom aerator adjacent the basin's bottom promotes an upwards directed movement of the water above the point, or points of exit. The so created currents diverge laterally adjacent the liquid surface and are then directed downwards and inwards due to the suction effect of the outflowing and rising air. In the case of bottom aerators with elongate air exit areas this leads to the creation of substantially cylindrical circulation currents on both sides of the aerator, which may attain a width of up to 5 meters or more on each side. These circulation currents will also be effective adjacent the borders of the basin, thus preventing the formation of dead anaerobic zones in these areas.

The apparatus according to the invention offers all the necessary conditions for a natural purification of the wastewater by the active sludge. The active sludge is offered ideal cyclic living conditions and is thereby enabled to fully perform its role in the wastewater purification. The biomass population can freely develop. The omni-directional sweeping movement of the aerator trains ensures that the active sludge is adequately nourished by the introduced oxygen and prevented from settling on the basin's bottom during the aeration cycle. In the case of a sufficiently large basin, the danger of the entire installation dying off is considerably reduced. Even if in case of extremely high loading if a portion of the basin should die off, this would not lead to the same consequences as in known purification plants which in this case have to be completely cleaned and then carefully reactivated. The apparatus according to the invention permits the active sludge in a died-off portion of the basin to be regenerated without the necessity of completely emptying the basin and subsequent reactivation.

In one advantageous embodiment (not shown), the invention provides that each bottom aerator has a vertical connecting tube connected at its upper end to the carrier for oscillating movement about the longitudinal axis thereof, and connected at its lower end to a tubular manifold provided with air exit openings and extending parallel to the carrier.

This construction of the bottom aerators is effective to enhance the self-induced omni-directional sweeping movements of the aerator train which is brought about by air rising to the liquid surface causing upward currents resulting in a swell beneath the home position of the aerator carrier. The force resulting therefrom tends to push the respective section of the aerator train toward the outside of the swell, so as to enhance the travel of the carrier.

For facilitating the oscillating movement of the bottom aerators, they are preferably provided adjacent their upper ends with a float extending along the longitudinal axis of the carrier.

In a further advantageous embodiment the invention provides that the carrier is formed by the air supply conduit. This conduit is then fully able to resist the tensional and possibly torsional forces acting on the carrier so as to perform the carrying function thereof.

Similarly the air supply conduit may also form the float. In this manner the air contained in the conduit is employed for the floating support of the bottom aerators.

Other objects and advantages will become obvious when taken into consideration with the following specifications and drawings.

DETAILED DESCRIPTION OF THE DRAWINGS

Figure 1:
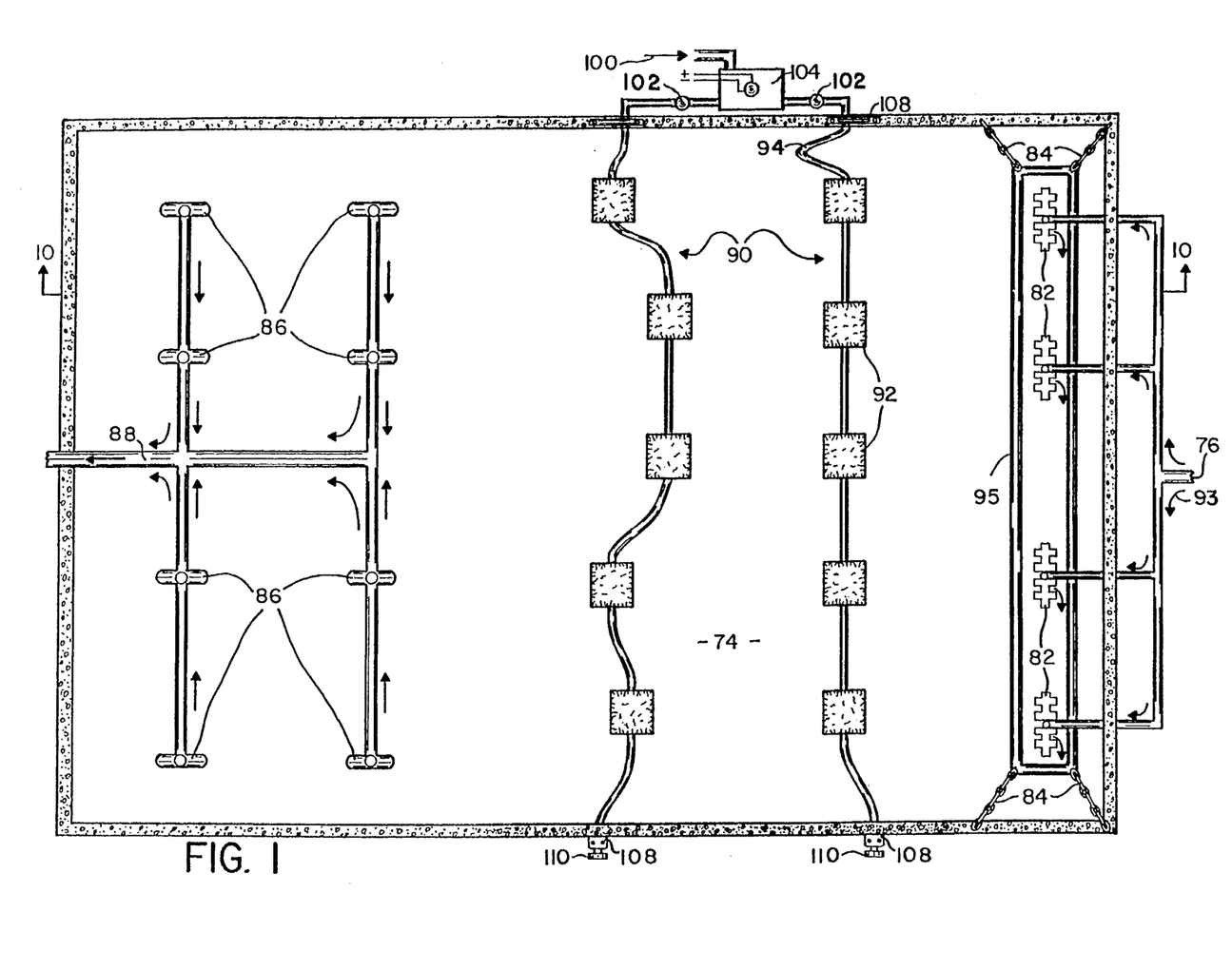
FIG. 1, is a top plan view of a wastewater treatment process as described in the present invention and other related applications by the same inventor.
Figure 3:
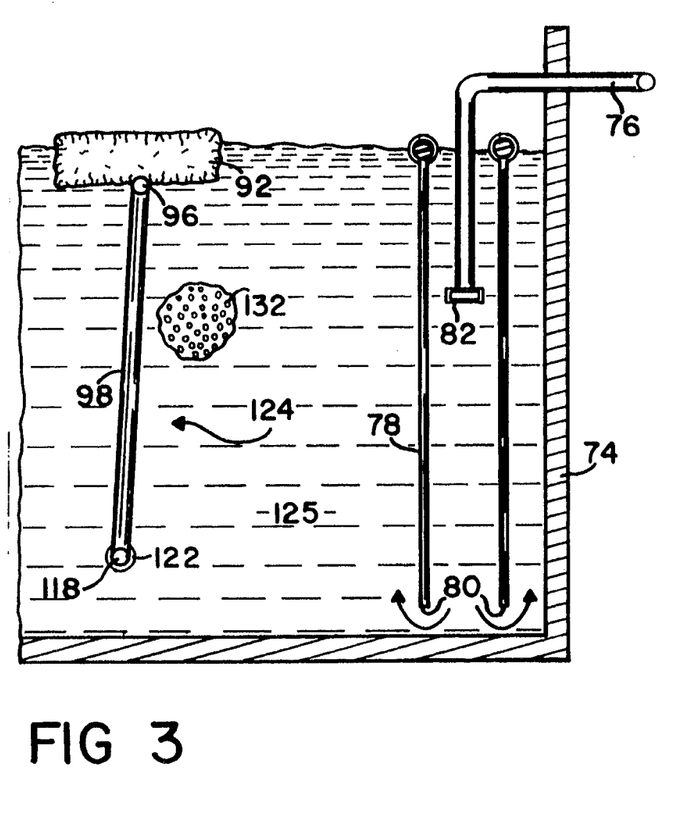
FIG. 3, is a side plan view of the incoming influent end section of the present invention including one aeration and float apparatus housed in a tank.
Figure 4:
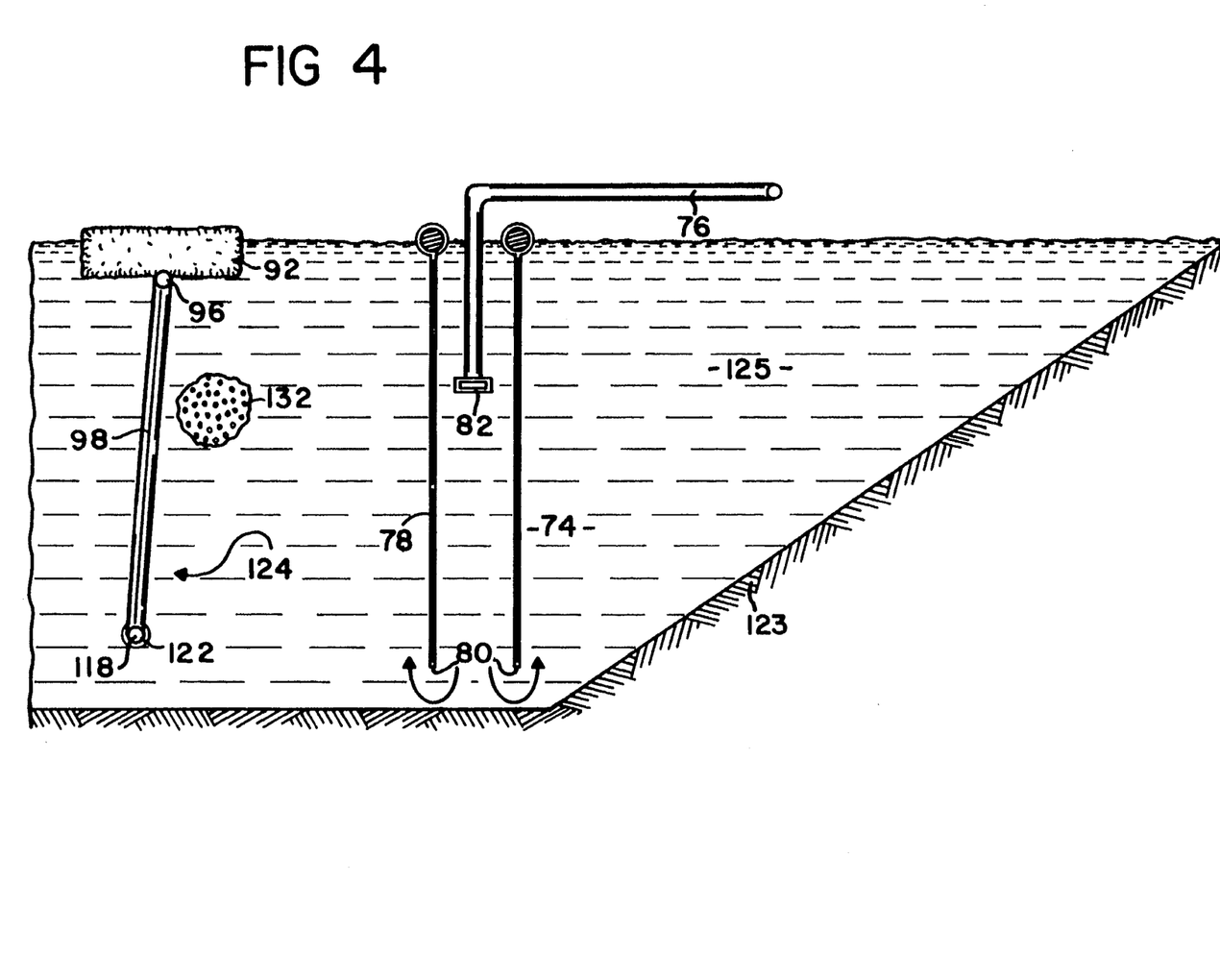
FIG. 4, is a side plan view of the incoming influent end section of the present invention including one aeration and float apparatus housed in an earthen basin.

Referring now in detail to the drawings wherein like characters refer to like elements throughout the various drawings, in FIG. 1, a diagrammatic top plan view is disclosed for a larger, open basin, such as an earthen or concrete basin as may be used in municipal installations with 74 being a typical open basin with 76 being the influent inlet delivery pipe and 78 (as depicted in FIGS. 3 & 4) being the Omni-flow partition which may be made of any suitable material such as fiber-glass, coated metal or any other suitable curtain material, having an open skirt area 80 with ganged or multiple manifolds 82 with the Omni-flow partition 78 having height adjustment means such as chains 84. 86 are ganged or multiple decanters and 88 being the effluent discharge pipe. The Omni-flow partition 78, the multiple or ganged manifolds 82, and the multiple or ganged decanters 86 cooperate with the aeration system now disclosed and considered by the inventor to be the invention, and a control system such as taught in patent applications '860 and '113.

Figure 2:
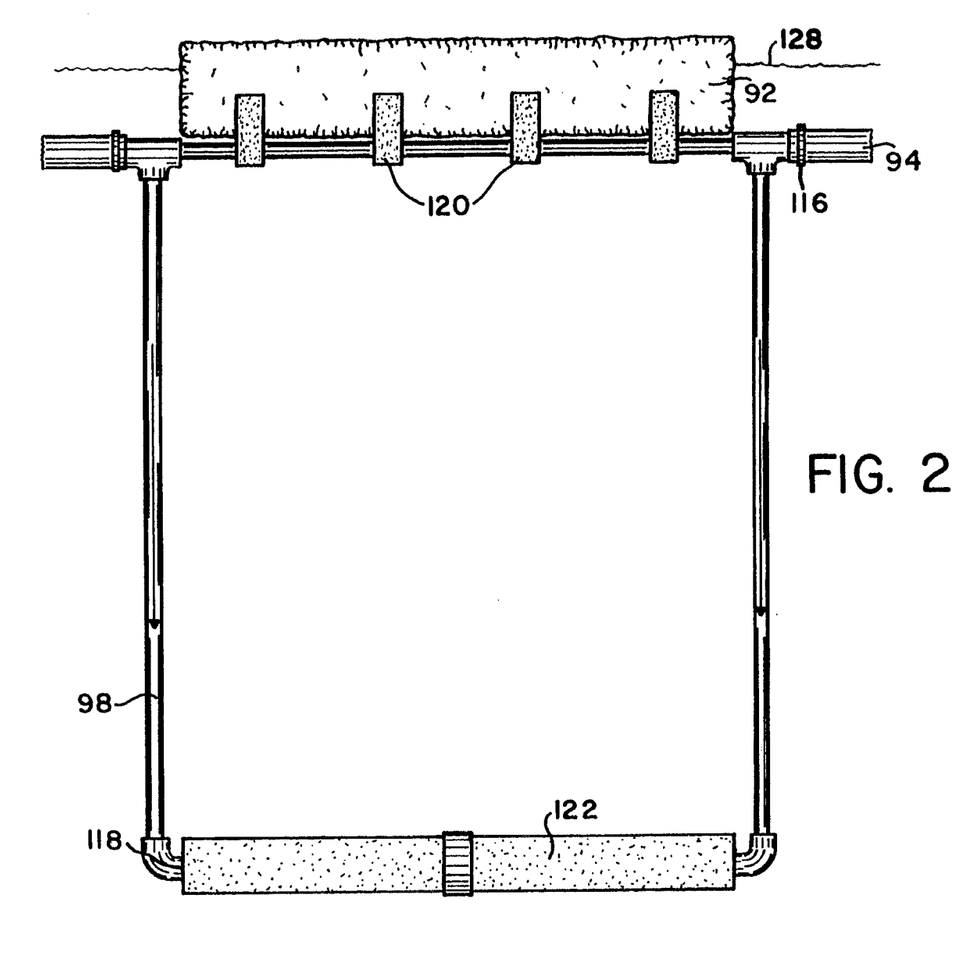
FIG. 2, is a side view in elevation of an aeration apparatus including a float.

In general, 90 are multiple aeration diffuser "trains" consisting of floats 92 and flexible air lines 94, with 94 feeding the aeration diffusers 98 as depicted in FIGS. 2, 3 and 4, while 100 is an input air line being controlled through solenoid operated valve 104. 102 are regulators to set the air flow of each bladder "train" and aeration "train" to a pressure of engineering choice, while 108 are suitable mounting means for flexible air lines 94, with 110 being caps to close off the air lines 94.

In FIG. 2, float 92, which may be made in multiple sections (not shown) is suitably attached my means such as VELCRO straps 120 to aeration diffusers 98 which are suitably connected by connectors 116 to flexible air line 94.

The aeration diffusers 98 may take a number of shapes such as a "T" (not shown) or the like, with the preferred embodiment being in the form of a rectangle with its length being vertical and its width being horizontal which eliminates entanglement when two of the diffusers 98 in different trains approach each other. The cross bar 118 is covered by prior art rubber sleeves 122 such as exemplified by the product Flexain (tm) and manufactured by "Environmental Dynamics of Columbia, Ohio).

In FIG. 3, we show the aerators 98 being used in concrete basin 74 while in FIG. 4, we show the aerators 98 being used in an earthen basin 123, while 125 is the sludge in a mixed and aerated state during the air/on phase.

Figure 5:
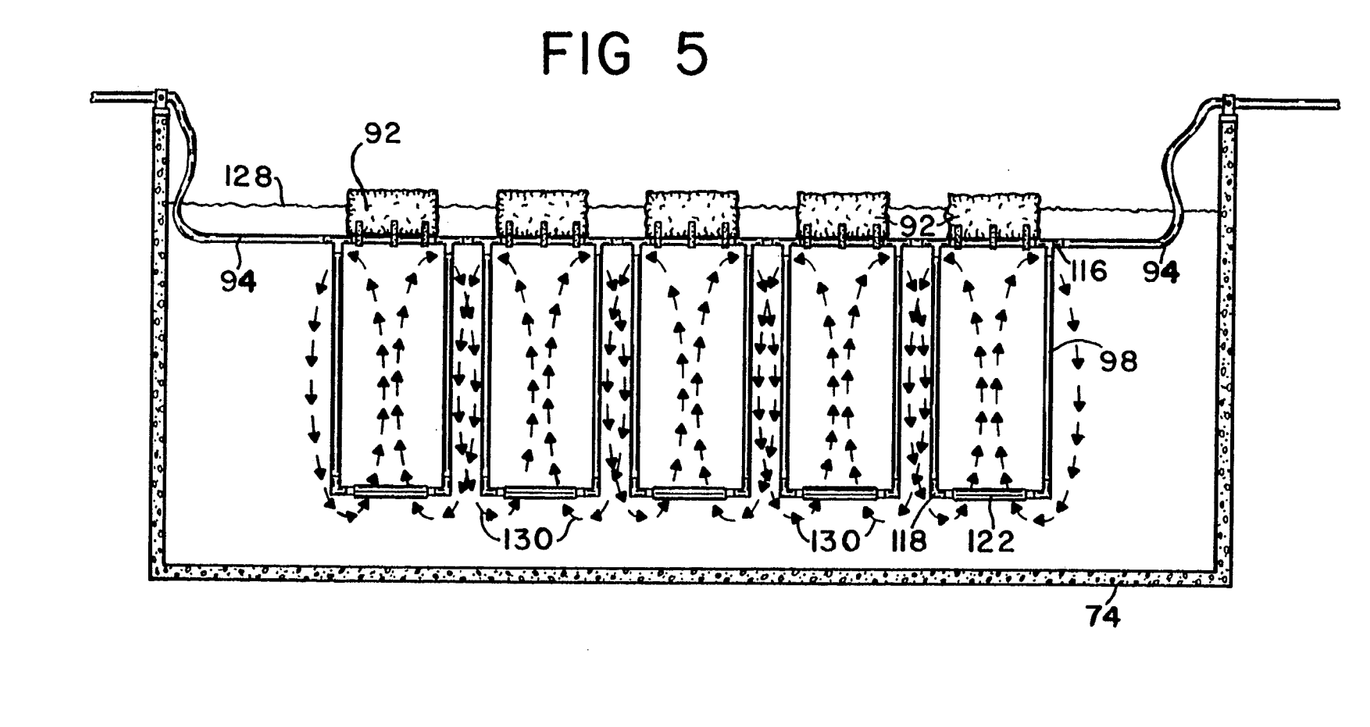
FIG. 5, is a plan view in elevation of the present invention aeration system which shows the action of the liquid during its air/on cycle.

In FIG. 5, we show a plan view of the action of the liquid in the basin during the air/on cycle and it will be seen that uprising bubbles 132 (as depicted in FIGS. 3 & 4) cause the liquid to circulate in the direction of arrows 130, thus picking up the sludge blanket which has settled to the bottom of the basin during the air/off cycle.

It will now be seen that we have provided a wastewater treatment system substantially consisting of a tank, or open earthen basin, an influent delivery system, an influent velocity equalization manifold within the tank into which the incoming influent is first deposited with the manifold being surrounded by a square, circular, L-shaped or rectangular partition suspended above the tank floor or an earthen basin and substantially extending from the bottom to the top of the tank or earthen basin, thus, providing a pre-stratification zone through which only solids of a settled nature are allowed to pass through, submersible aeration means in the main tank or earthen basin, subsurface air diffusers, a floating check-valved solids excluding decanter to decant supernatent from below the surface of the liquid level, an optimum location for the floating decanter, multiple floating switches which are adjustable in height, a programmable timer, a manway, and an access cover located substantially above the I.V.E. collector, whereby, the various named elements cooperate together to provide a minimum of hydraulic turbulence and a maximum quality of supernatent effluent, even in the event of excessive hydraulic organic input of influent.

It will also be seen that we have provided an aeration diffusion system which is controlled by the control panel of a wastewater treatment system that allows the diffuser, along with the aeration "train" to wander in an omni-direction over the basin floor covering an amoebic area due to the circular and boiling action of the liquid which aerates substantially the entire floor of the basin.

Although the invention has been shown and described in what is conceived to be the most practical and preferred embodiment, it is recognized that departures may be made therefrom within the scope and spirit of the invention, which is not to be limited to the details disclosed herein but is to be accorded the full scope of the claims so as to embrace any and all equivalent devices and apparatus.

Having described our invention, what we claim as new and desire to secure by Letters Patent is:

1. A continuous feed, cycle, extended aeration activated sludge, wastewater treatment system for the purification of wastewater influent to facilitate aerobic, anoxic, anaerobic treatment phases of activated sludge extended aeration technology including the functions of flow equalization, biological oxidation, nitrifiction, denitrification, secondary sedimentation and aerobic sludge digestion comprising at least one basin with each of said at least one basin comprising; a floor for receiving said influent, an influent inlet, an omni-flow partition, said partition being adjacent said inlet and constructed and arranged to direct substantially all of said influent underneath said partition, said partition being suspended above said floor, substantially separating a zone containing a prestratification liquid from said basin liquid, a zone containing a partition being positioned to prevent hydraulic communication between said basin liquid and said pre-stratification zone liquid during an air/off cycle, said partition allowing mix communication between said basin liquid and said pre-stratification zone liquid during an air/on cycle, aeration means mounted to aerate both said pre-stratification zone liquid and said basin zone liquid, said aeration means including: at least one elongated air supply flexible conduit extending substantially across a basin liquid surface and having a varying amount of slack in its length, at least one float, means to attach said at least one float to said at least one flexible conduit, at least one bottom aerator and means to attach said at least one bottom aerator to said at least one flexible conduit and decanting means, each of said aeration means and said decanting means having on and off control means, each of said at least one float being movable between a first and second position, said first position being an air/off home position, said second position being an air/on position, whereby for each of said at least one basin, when said at least one float means is in its said first home position, said at least one bottom aerator discharges air adjacent the bottom of said at least one basin, said air rising to said liquid surface causing upward currents resulting in a swell beneath said at least one float perpetually sweeping said at least one float away from said home position in a random direction, causing the at least one aerator to trail at a relative distance in an amoeboid motion moving said at least one aerator omni-directionally over said floor of said at least one basin covering an amoebic shaped area.

2. The wastewater treatment system of claim 1 in which each of said bottom aerators has two vertical connecting tubes connected at their upper ends to said respective at least one flexible conduit and connected at their lower ends to a tubular manifold provided with air exit openings and extending parallel to said at least one flexible conduit.

3. The wastewater treatment system of claim 2 in which said vertical connecting tubes are flexible.

4. The wastewater treatment system of claim 1 in which each of said at least one basin comprises a plurality of bottom aerators disposed in series and having their upper ends inter-connected by flexible sections of said respective at least one air supply flexible conduit.

5. The wastewater treatment system of claim 1 characterized in that each of said air supply flexible conduits forms a carrier.

6. The wastwater treatment system of claim 1 in which each of said conduits are alterable in length.

7. The wastewater treatment system of claim 1 characterized in that the ends of each said conduits are attached to stationary anchoring points.

* * * * *